(12) United States Patent
Beaulieu

(10) Patent No.: US 8,048,298 B2
(45) Date of Patent: Nov. 1, 2011

(54) HOUSEHOLD EFFLUENT PURIFICATION PLANT

(76) Inventor: Bernard Beaulieu, Chassiers (FR)

( * ) Notice: Subject to any disclaimer, the term of this patent is extended or adjusted under 35 U.S.C. 154(b) by 724 days.

(21) Appl. No.: 12/160,499

(22) PCT Filed: Jan. 9, 2007

(86) PCT No.: PCT/FR2007/050634

§ 371 (c)(1),
(2), (4) Date: Aug. 11, 2008

(87) PCT Pub. No.: WO2007/083053

PCT Pub. Date: Jul. 26, 2007

(65) Prior Publication Data

US 2011/0192780 A1 Aug. 11, 2011

(30) Foreign Application Priority Data

Jan. 20, 2006 (FR) ...................... 06 50204

(51) Int. Cl.
*B01D 21/02* (2006.01)
*C02F 1/52* (2006.01)
(52) U.S. Cl. ..... 210/199; 210/202; 210/207; 210/257.1; 210/258; 210/261
(58) Field of Classification Search .................. 210/199, 210/200, 201, 202, 203, 205, 207, 256, 258, 210/259, 261
See application file for complete search history.

(56) References Cited

U.S. PATENT DOCUMENTS

| 2,366,898 A | 12/1939 | Gurney |
| 5,407,584 A | 4/1995 | Broussard, Sr. |
| 2004/0025961 A1* | 2/2004 | Beaulieu ......................... 141/69 |

FOREIGN PATENT DOCUMENTS

| FR | 2810310 A1 | 12/2001 |
| WO | WO01/40121 A1 | 6/2001 |

OTHER PUBLICATIONS

English translation of the Written Opinion of the International Search Authority (Form PCT/ISA/237).

* cited by examiner

*Primary Examiner* — Nam Nguyen
*Assistant Examiner* — Lucas Stelling
(74) *Attorney, Agent, or Firm* — Baker & Daniels

(57) ABSTRACT

Plant comprising a homogenization tank (100) equipped with a stirrer (120) and with a pumping unit (140), a connecting pipe (300) leaving the pumping unit (140) comprising an injector of reagents (310) and a static mixer (320), a second chamber (200) surmounted by a mixing tank (210) into which the connecting pipe (300, 320) opens tangentially and comprising a flocculation pan (220) above the sludge pit (230) and surmounted by a filtration chamber (240), a pipe (270) leading down to the bottom (222) of the flocculation pan (220) and a bypass pipe (160).

8 Claims, 1 Drawing Sheet

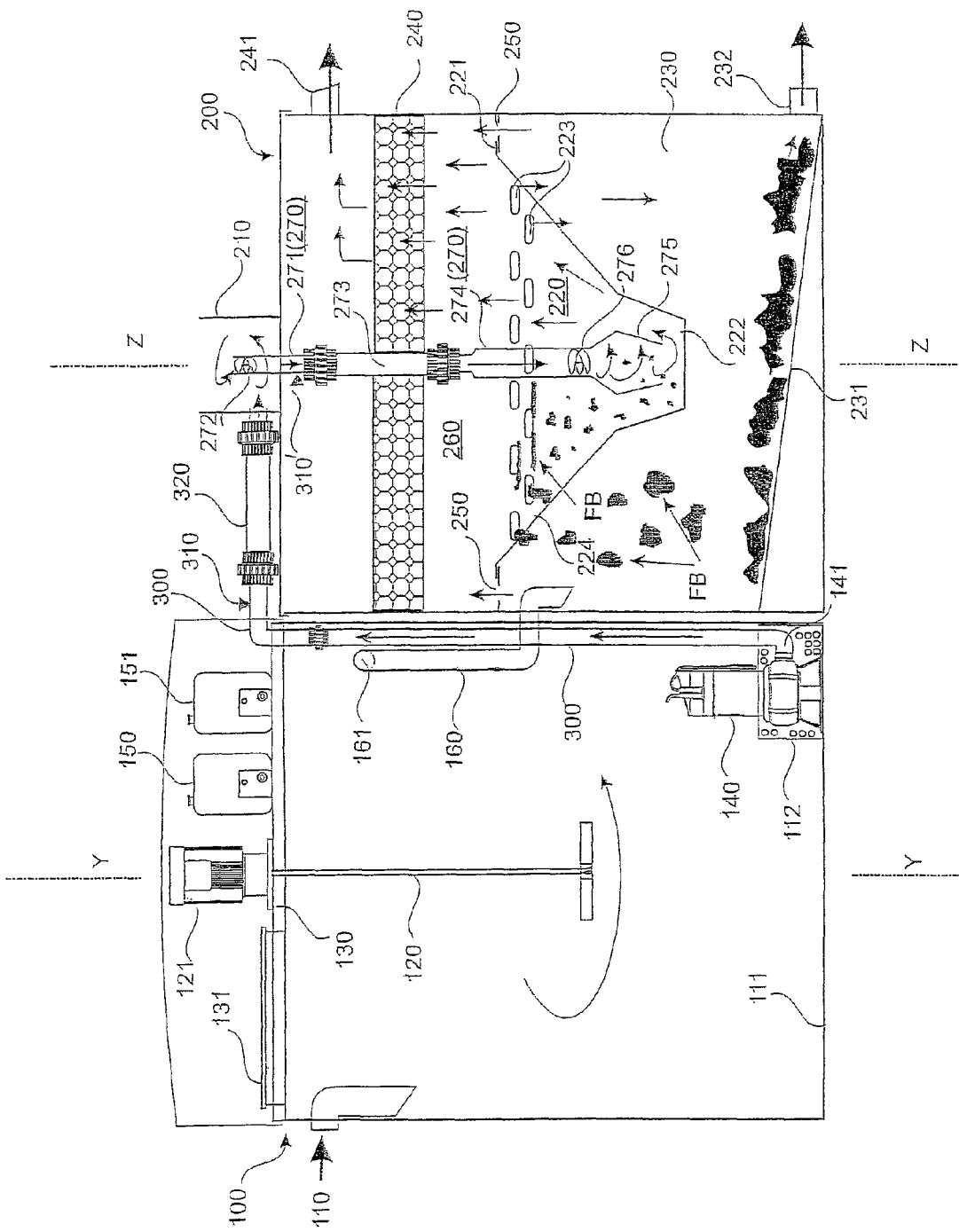
SINGLE FIGURE

HOUSEHOLD EFFLUENT PURIFICATION PLANT

FIELD OF THE INVENTION

The present invention relates to a domestic effluent purification installation comprising
- a homogenisation vessel which receives the effluent,
- a flocculation tank comprising an upper, tapered portion extended by a lower portion, which flocculation tank is located inside the clarification vessel and in which sludge flocs form,
- a descending pipe which connects the homogenisation vessel to the lower portion of the flocculation tank through which the effluent passes from bottom to top and is clarified on contact with the sludge flocs,
- the pipe comprising an upper tube, one end of which is connected to the homogenisation vessel and the other end of which opens into a lower tube having a larger diameter than the upper tube, the lower end thereof opening into the lower portion of the flocculation tank,
- a sludge vessel which receives the sludge that flows over from the flocculation tank.

PRIOR ART

Such an effluent purification installation for industrial application in the treatment of relatively large volumes, which may be heavily loaded with pollutants, is already known.

Accordingly, such an installation is not suitable for the treatment of domestic effluent in small amounts or that is not heavily loaded with polluting products because, in addition to questions of size, the operation of the installation, even when reduced to an appropriate scale, would not be efficient with a very low, discontinuous flow rate, and there would even be a risk of the installation becoming blocked.

OBJECT OF THE INVENTION

The object of the present invention is to develop a domestic effluent purification installation which is simple in terms of structure, is easy to use and maintain, has a small space requirement and is compatible with a domestic application, that is to say relatively low, discontinuous effluent flow rates.

DESCRIPTION AND ADVANTAGES OF THE INVENTION

To that end, the present invention relates to an effluent purification installation of the type described hereinbefore, characterised by A—a first chamber which forms the homogenisation vessel and is equipped with an agitator and a pumping unit, B—a connecting pipe at the outlet from the pumping unit, comprising a reagent injector and a static mixer, C—a second chamber surmounted by a mixing vessel into which the connecting pipe opens tangentially, comprising
- a flocculation tank in the form of an inverted truncated cone located above the sludge vessel and surmounted by a filtration chamber, the flocculation tank having in its upper portion openings for the passage of the sludge flocs,
- a pipe descending from the mixing vessel to the bottom of the flocculation tank,
- as well as an outlet for purified water above the filtration chamber, D—a by-pass pipe connecting the upper portion of the homogenisation vessel, beneath the level of the effluent inlet, directly to the sludge vessel.

This installation, which is simple to produce and install, permits normal dynamic operation by controlling the agitator and the pumping unit, which supply homogenised effluent volumes to the second chamber in which separation of the sludge and final filtering are carried out. However, this normal operation also permits emergency, static, purely biological operation, that is to say without the injection of reagents or agitation and pumping, by limiting operation to the most liquid parts and temporarily leaving the solid particles at the bottom of the homogenisation vessel. When the installation is again able to operate dynamically, the solid particles deposited at the bottom of the vessel are re-suspended with the agitator to give a homogeneous liquid which is taken up by the pumping unit which, being equipped with a blade pump, breaks up the components to give a more homogeneous mixture with smaller particles which then reach the second chamber. Maintenance of the installation can be carried out without difficulty. Normal maintenance, that is to say filling of the reservoirs with reactive agents, does not pose any particular difficulties and, in case of problems with a piece of equipment, the agitator and the pumping unit are easily accessible in the first chamber. Any blocked pipes are also very accessible: it is merely necessary to remove a few joining elements in order to reach the part requiring further intervention.

Finally, evacuation of the sludge is also carried out in a simple manner at the outlet of the upstream vessel.

According to another characteristic, the pumping unit is a fractionating pumping unit which permits a reduction in the size of the solid portions of the effluent.

According to another characteristic, the effluent is supplied to the homogenisation vessel by an immersed tube. In the case of a stoppage of the pumping unit, the immersed tube allows a maximum amount of heavy elements to be separated in the homogenisation vessel so that static operation enables the liquid, which is less loaded, to be removed from the upper portion of the homogenisation vessel directly into the sludge vessel, with the stirrer stopped.

According to another characteristic, the descending pipe connecting the outlet of the mixing vessel to the flocculation tank projects into the mixing vessel and its upper portion is equipped with a helicoidal guide as its outlet upstream of a chamber for calming the flow in the form of two inverted truncated cones joined by their large base.

Imparting a rotational movement, or more precisely a helicoidal movement, to the liquid promotes the mixing and subsequent agglutination of the particles in order to develop flocs during the slow rise of the liquid in the flocculation tank.

The pipe leaving the mixing vessel is advantageously equipped with a reagent injection point followed by a static mixer for joining a portion of the descending pipe, having a slightly large cross-section, before opening into the flocculation tank.

The flocculation tank advantageously has a casing in the form of a double truncated cone which widens towards the top, and the descending pipe opens into the volume delimited by the small truncated cone, the casing having openings for the passage of the sludge flocs, close to its upper edge.

The openings are preferably distributed in two staggered peripheral rows so that the flocs, which cake together and rise increasingly more slowly along the wall of the flocculation tank, owing to the increasingly widened shape thereof and to the consequent slowing down of the liquid, thus necessarily reach an opening and overflow therefrom and fall down into the sludge vessel.

The bottom of the sludge vessel advantageously slopes towards the outlet.

According to another characteristic, the filtration chamber is constituted by a filtering composition enriched with biological powders, and that chamber occupies the entire cross-section of the chamber between the bottom of the flocculation tank and the outlet. The filtering composition can be replaced.

DRAWINGS

The present invention will be described in greater detail hereinbelow by means of an example of a domestic effluent purification installation shown in the accompanying single FIGURE, which is a view in diagrammatic section of the installation.

DESCRIPTION OF AN EMBODIMENT OF THE INVENTION

According to the FIGURE, the invention relates to a domestic effluent purification installation composed of a first chamber 100 of cylindrical shape which constitutes a homogenisation vessel which receives the effluent to be treated. The homogenisation vessel 100 is connected by a connecting pipe 300 to a second chamber 200 which is surmounted by a mixing vessel 210. The second chamber 200 contains a flocculation tank 220 to which the liquid from the mixing vessel 210 is supplied for the purpose of flocculation of the sludge, which passes in the form of flocs into the sludge vessel 230 from which it is periodically evacuated. The water separated from the sludge rises through a filtration chamber 240 to the outlet.

In greater detail, the first chamber 100 is a structure of cylindrical shape with a circular cross-section equipped with an effluent inlet 110 constituted by a bent, immersed tube. The vessel 100 is equipped with an agitator 120 driven by an electric motor 121 which is installed on the top 130 of the vessel 100 and operates in a controlled manner, for example periodically and/or as a function of the supply of liquid. The vessel 100 is equipped with a pumping unit 140 which is installed at the bottom 111 of the vessel 100 in a cage 112 which is in communication with the remainder of the vessel and protects the pumping unit. The pumping unit 140 comprises a blade rotor for shredding and homogenising the products suspended in the pumped effluent. The delivery side 141 of the pump is connected to the connecting pipe 300, which rises inside the vessel 100 to above the second chamber 200 and opens tangentially into the mixing vessel 210. The connecting pipe 300 comprises at its outlet a reactive agent injector 310 and then a static mixer 320, that is to say a path in which the reactive agents are naturally mixed with the flow of liquid and open tangentially into the mixing vessel 210. The tangential arrival creates a vortex circulation of the liquid in the mixing chamber.

Above the first chamber 100 there is the motor 121 for the agitator 120 as well as reservoirs 150, 151 containing the reactive agent or agents for injection into the connecting pipe 300. These pieces of equipment are easily accessible for maintenance and filing of the reservoirs 150, 151. The top 130 of the vessel 100 is removable and comprises a trap door 131 for removal of the pumping unit 140 and access to the delivery pipe 300.

The homogenisation vessel 100 also comprises a by-pass pipe 160, the inlet 161 of which is slightly below the level of arrival 110 of the liquid in the vessel 100 and which opens into the sludge vessel 230 of the second chamber 200. In this example, the first chamber is cylindrical with a circular cross-section of axis YY.

The second chamber 200, which is also constituted by a cylindrical volume of circular cross-section, of axis ZZ, is composed, from bottom to top, of the sludge vessel 230, the bottom 231 of which slopes towards the outlet 232 for pumping of the sludge. Above the bottom 231, the sludge vessel 230 accommodates the flocculation vessel 220 formed by a biconical casing which widens to the top and is terminated by an edge 221 supported by a punched-out flange 250 fixed to the wall of the chamber 200. Above the vessel 220 there is a calming and distributing space 260 surmounted by the filtration chamber 240, which is constituted by a thick disk loaded with a filtering composition containing biological powders so as to provide final filtration of the cleaned water.

In the axis ZZ of the chamber 200, the descending pipe 270 connects the mixing vessel 210 to the base of the flocculation tank 220. The descending pipe 270 is composed of an upper part 271 which projects into the mixing vessel 210 in order to reinforce the vortex movement of the liquid arriving from the static mixer into the mixing vessel. In the upper part, the inlet of the pipe is provided with a helicoidal guide 272 which is oriented so as to retain the vortex movement of the liquid inside the descending pipe 270 equipped with a reagent injection point 310'. The pipe 270 is extended by a static mixer 273, that is to say a path in which the reactive agents mix with the flow of liquid and enter a descending pipe portion 274 of slightly larger cross-section, in order to reach the flocculation tank 220.

The various parts of the descending pipe 270 are connected by joining elements such as the joining element 271, facilitating mounting and dismantling of this part of the installation, for example for maintenance work.

Beneath the filtration chamber 240, the descending pipe 274 increases in cross-section slightly in order to reach the flocculation tank 220, and its outlet terminates in a casing 275 in the form of a double truncated cone constituting a chamber for calming the flow. Upstream of the calming chamber, the part 274 of the pipe is again equipped with a helicoidal guide 276 for assisting the helicoidal movement of the flow as it enters the calming chamber 275. The bottom of the calming chamber is open above the bottom of the lower portion 222 of the flocculation tank 220.

The flocculation tank 220 comprises, in its upper portion, two rows of openings 223 which are offset relative to one another and constitute outlets for the sludge flocs FB.

The sludge cakes together to form flocs in the liquid which rises in the flocculation tank 220 while reducing speed as a function of the increase in cross-section of the tank. The sludge flocs FB entrained by the slow movement of liquid along the wall 224 of the flocculation tank 220 are thus able to rise and escape through the openings 223 and then fall by gravity to the bottom 231 of the sludge vessel 230. The water cleaned of a considerable part of its sludge then rises in the calming and distribution chamber 260 above the flocculation tank 220 and then passes through the filtration chamber 240 and escapes in the filtered state through the outlet 241.

The installation is simple to install and assemble. All the components of the homogenisation vessel 100 can be put in place after installation of the actual vessel. The same is true of the second chamber 200, which first receives the flocculation tank 220 and then the filtration chamber 240, to which there has been fixed, by a joining element, the third part 274 of the descending pipe 270. After this installation, the upper part 271 of the descending pipe is fixed by a joining element and the mixing vessel 210 is installed. The branching of the mixing vessel 210 with the static mixer 320 and its connection to the delivery pipe 300 of the pumping unit 140 are likewise carried out by simple joining elements.

If there is a problem with a component of the installation, it is easy to gain access to that component or to remove it. For example, the motor 121 of the agitator 120 is accessible directly above the homogenisation vessel 100. The pumping unit 140 can be removed from the homogenisation vessel 100 because it is in principle simple positioned in its cage 112. The delivery pipe 300 is accessed by simply removing a joining element. Although the second chamber 200 comprises only static elements, all of the elements are accessible from the top in the case of exceptional blocking.

The effluent purification installation described above operates as follows: the effluent arrives at the homogenisation vessel 100, generally in a discontinuous manner, through the immersed tube 110. The effluent is mixed by the agitator 120 and homogenised before being aspirated by the pump 140, the knives of which shred the solid elements in order to have elements of a size smaller than a fixed limit. The knife pump 140 is controlled, for example, by a float and/or by a clock so that it periodically pumps a certain volume of effluent. That volume of effluent is homogenised by the agitator 120 before being pumped.

The effluent so pumped passes into the reactive agent injector 310, where it receives reactive agents which assist with its downstream processing. The reactive agents are mixed with the effluent in the static mixer 320 and then the flow enters the mixing vessel 210 tangentially, where it rotates according to a vortex movement before passing into the descending pipe 270, in which the circular movement is sustained by the helicoidal guide 271 at the inlet. The liquid descends in the pipe 276 according to a rotating movement, which is reactivated close to the outlet of the pipe, upstream of the calming chamber 275. In that chamber, the flow continues to rotate according to a helicoidal movement and then passes into the flocculation tank 220. The gradual increase in cross-section slows down the flow, which becomes very slow in the flocculation tank. Sludge flocs FB are gradually separated from the flow of effluent, and the cleaned liquid rises in the calming chamber 260 before passing through the filtration chamber 240 and passing through the outlet 241.

The level of liquid in the second chamber 200 is fixed by the height of the outlet 241 for filtered water, while the level of liquid in the first chamber 100 varies as a function of the volumes pumped. The by-pass pipe 160 which connects the upper portion of the homogenisation vessel 100 to the sludge vessel 230 permits static operation of the installation if there is a fault with the pumping unit 140. The liquid in the homogenisation vessel 100 is removed in its upper portion, having been freed of the main solid portions which, resting in the agitator 120, descend by gravity to the bottom of the homogenisation vessel and are not mixed. The liquid close to the upper level of the vessel then passes through the sludge chamber 230, in which there is removed a smaller fraction of solid particles than if flocculation reagents had been added as in normal operation. The liquid then rises through the punched-out flange 250 and, optionally, the openings 223 of the flocculation tank 220 in order to pass through the filtering composition 240 and be evacuated.

The invention claimed is:

1. A domestic effluent purification installation, comprising
a mixing vessel (210) which receives effluent,
a flocculation tank (220) comprising an upper, tapered portion extended by a lower portion, which flocculation tank is located inside a clarification vessel and in which sludge flocs form,
a descending pipe (270) which connects the mixing vessel (210) to the lower portion of the flocculation tank (220), through which the effluent passes from the bottom to top and is clarified on contact with the sludge flocs,
the descending pipe (270) comprising an upper tube, one end of which is connected to the mixing vessel (210) and the other end of which opens into a lower tube having a larger diameter than the upper tube, the lower end thereof opening into the lower portion of the flocculation tank,
a sludge vessel (230) which receives the sludge that flows over from the flocculation tank (220),
characterised by
A—a first chamber (100) which forms a homogenisation vessel and is equipped with an agitator (120) and a pumping unit (140),
B—a connecting pipe (300) at the outlet from the pumping unit (140), comprising a reagent injector (310) and static mixer (320),
C—a second chamber (200) which forms the clarification vessel surmounted by the mixing vessel (210) into which the connecting pipe (300, 320) opens tangentially, comprising
the flocculation tank (220) in the form of an inverted truncated cone located above the sludge vessel (230) and surmounted by a filtration chamber (240), the flocculation tank (220) having in its upper portion openings (223) for the passage of the sludge flocs,
the descending pipe (270) descending from the mixing vessel (210) to the bottom (222) of the flocculation tank (220),
as well as an outlet (241) for water from a filtration chamber (240), and
D—a by-pass pipe (160) connecting the upper portion of the homogenisation vessel (100), beneath the level of an effluent inlet of the homogenization vessel, directly to the sludge vessel (230).

2. The installation according to claim 1,
characterised in that
the pumping unit (140) is a fractionating pumping unit.

3. The installation according to claim 1,
characterised in that
the effluent is supplied to the homogenisation vessel by an immersed tube (110).

4. The installation according to claim 1,
characterised in that
the descending pipe (270) connecting an outlet of the mixing vessel (210) to the flocculation tank (220) in the mixing vessel (210) and upper portion of the descending pipe is equipped with a helicoidal guide (272), an outlet of the descending pipe also being equipped with a helicoidal guide (276) upstream of a flow calming chamber (275) formed by two inverted truncated cones joined by the large base of each truncated inverted cone.

5. The installation according to claim 1,
characterised in that
the descending pipe (270) leaving the mixing vessel (210) is equipped with a reagent injection point (310') followed by a static mixer (273) for joining a part (274) of the descending pipe (270) of slightly larger cross-section before opening into the flocculation tank (220).

6. The installation according to claim 1,
characterised in that
the flocculation tank (220) has a casing formed by a double truncated cone having a widened top, and the descending pipe (270) opens into a volume delimited by a smaller truncated cone (222), the casing having openings (223) for passage of the sludge flocs (FB) close to its upper edge.

7. The installation according to claim 1, characterised in that
the filtration chamber (240) is constituted by a filtering composition enriched with biological powders.

8. Installation according to claim 1, characterised in that
the sludge vessel (230) has a bottom (231) that slopes towards an outlet.

* * * * *